United States Patent
Komura et al.

(10) Patent No.: US 8,095,789 B2
(45) Date of Patent: Jan. 10, 2012

(54) UNAUTHORIZED COMMUNICATION DETECTION METHOD

(75) Inventors: Masahiro Komura, Kawasaki (JP); Masashi Mitomo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 572 days.

(21) Appl. No.: 12/222,179

(22) Filed: Aug. 4, 2008

(65) Prior Publication Data

US 2009/0044005 A1    Feb. 12, 2009

(30) Foreign Application Priority Data

Aug. 10, 2007   (JP) ................. 2007-210018

(51) Int. Cl.
*H04L 29/06* (2006.01)
(52) U.S. Cl. .............. 713/161; 726/13; 726/14; 726/22; 726/23; 713/151; 713/154
(58) Field of Classification Search ................ 726/3, 12, 726/13, 14, 22, 23, 24; 713/151, 153, 154, 713/160, 162

See application file for complete search history.

(56) References Cited

U.S. PATENT DOCUMENTS

2006/0198313 A1* 9/2006 Kitamura et al. ............. 370/241
2007/0169190 A1* 7/2007 Kolton et al. .................. 726/22

FOREIGN PATENT DOCUMENTS

JP    2006-279930    10/2006

* cited by examiner

*Primary Examiner* — Minh Dinh
*Assistant Examiner* — Izunna Okeke
(74) *Attorney, Agent, or Firm* — Staas & Halsey LLP

(57) ABSTRACT

According to an aspect of an embodiment, a method for controlling an apparatus for transferring data from a plurality of first devices to a second device via a network, the data being transferred by using a packet, the method comprises the steps of: extracting encryption information identifying method of encryption conveyed by a packet and destination information identifying destination of the packet transmitted from one of the first devices; counting the number of kinds of the destination information extracted from packets associated with the same encryption information, respectively; and determining an unauthorized communication when the number of kinds of the encryption information is less than a predetermined value.

6 Claims, 7 Drawing Sheets

| Encryption Method List | Access Destination #1 | Access Destination #2 | Access Destination #3 | Access Destination #4 |
|---|---|---|---|---|
| Crypt 1, Crypt 2, Crypt 3 | URL 1 | URL 2 | URL 3 | - |
| Crypt 1, Crypt 2, Crypt 4, Crypt 5 | URL 1 | URL 3 | URL 4 | URL 5 |
| Crypt 99 | URL 99 | - | - | - |
| : | : | : | : | : |

7521 — Encryption Method List column; 7522 — Access Destination columns

FIG. 5

| Encryption Method List | Access Source #1 | Access Source #2 | Access Source #3 | Access Source #4 |
|---|---|---|---|---|
| Crypt 1, Crypt 2, Crypt 3 | Client 1 | Client 2 | Client 3 | - |
| Crypt 1, Crypt 2, Crypt 4, Crypt 5 | Client 1 | Client 3 | Client 4 | Client 5 |
| Crypt 99 | Client 99 | - | - | - |
| : | : | : | : | : |

7531 — Encryption Method List column; 7532 — Access Source columns

UNAUTHORIZED COMMUNICATION DETECTION METHOD

BACKGROUND OF THE INVENTION

1. Field of the Invention

An aspect of the invention relates to techniques of the communication via the network.

2. Description of the Related Art

In the communication via the network, there is an illegal communication between a web server and a client. For example, a technology for detecting the illegal communication is disclosed in Japanese Laid-open Patent Publication No. 2006-279930.

To implement unauthorized communication, there exist methods that use HyperText Transport Protocol (HTTP) that is used in transmitting and receiving data between a web server and a client and Secure Socket Layer (SSL) that is a protocol for encryption. The SSL realizes the encryption using a region for the HTTP. Since the HTTP is used by clients to access a web server, even in firewalls that are systems to prevent unauthorized communication, communication is permitted. Accordingly, by using the HTTP, the unauthorized communication can be realized through the firewalls. Since the procedures in the unauthorized communication are not disclosed, the procedures are not known.

SUMMARY OF THE INVENTION

According to an aspect of an embodiment, a method for controlling an apparatus for transferring data from a plurality of first devices to a second device via a network, the data is transferred by using a packet, the method comprises the steps of: extracting encryption information identifying method of encryption conveyed by a packet and destination information identifying destination of the packet transmitted from one of the first devices; counting the number of kinds of the destination information extracted from packets associated with the same encryption information, respectively; and determining an unauthorized communication when the number of kinds of the destination information is less than predetermined value.

DESCRIPTION OF THE PREFERRED EMBODIMENTS

Hereinafter, an embodiment of the invention is described with reference to the drawings.

First, a communication utilizing the SSL on the HTTP is explained, then an example of unauthorized communications targeted in this embodiment is explained, and then a method for detecting unauthorized communications is specifically described.

At first, a communication utilizing the HTTP is explained. In the communication (SSL communication) using the SSL, a client and a web server negotiate an encryption method to be used in the communication at the initial step. The negotiation is performed according to the following procedure. First, the client transmits a list of encryption methods that can be used at the client side to the web server. Then, the web server receives the encryption list, select an encryption method that can be used at the web server side, and transmits the selection result to the client. The encryption method list differs depending on browsers that are software used for browsing web pages.

Hereinafter, characteristics of the encryption method list in authorized communication and unauthorized communication that use the SSL are described. The characteristics are analogized from packets and a communication log that stores the packets.

In a case of the authorized SSL communication, a plurality of persons access a plurality of web servers using well-known browsers. Accordingly, in a case where types of the access destinations are counted for each encryption method list sent from the clients, it shows a characteristic that the number of the types of the access destinations naturally increases.

On the other hand, in a case of the unauthorized SSL communication, a particular person accesses a single server using a particular browser. Accordingly, if types of the access destinations are counted for each encryption method list sent from the client, the number of the types of the access destinations does not increase. It is possible to analogize whether the unauthorized communication is performed or not by focusing on characteristics of a list (encryption method list) of encryption methods used in the SSL on the HTTP.

Next, an example of unauthorized communications targeted in this embodiment is explained.

1. Example of Unauthorized Communication

Figure 1:
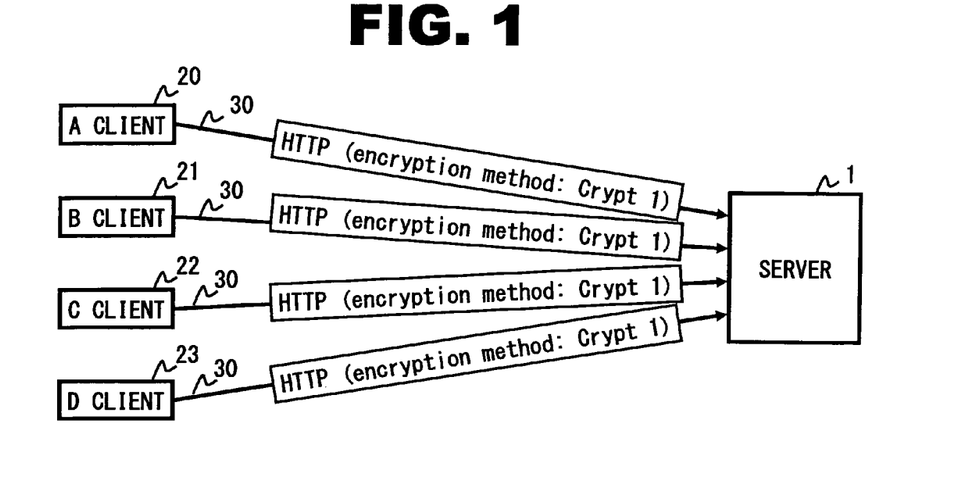
FIG. 1 is a view illustrating an example of unauthorized communication.
Figure 2:
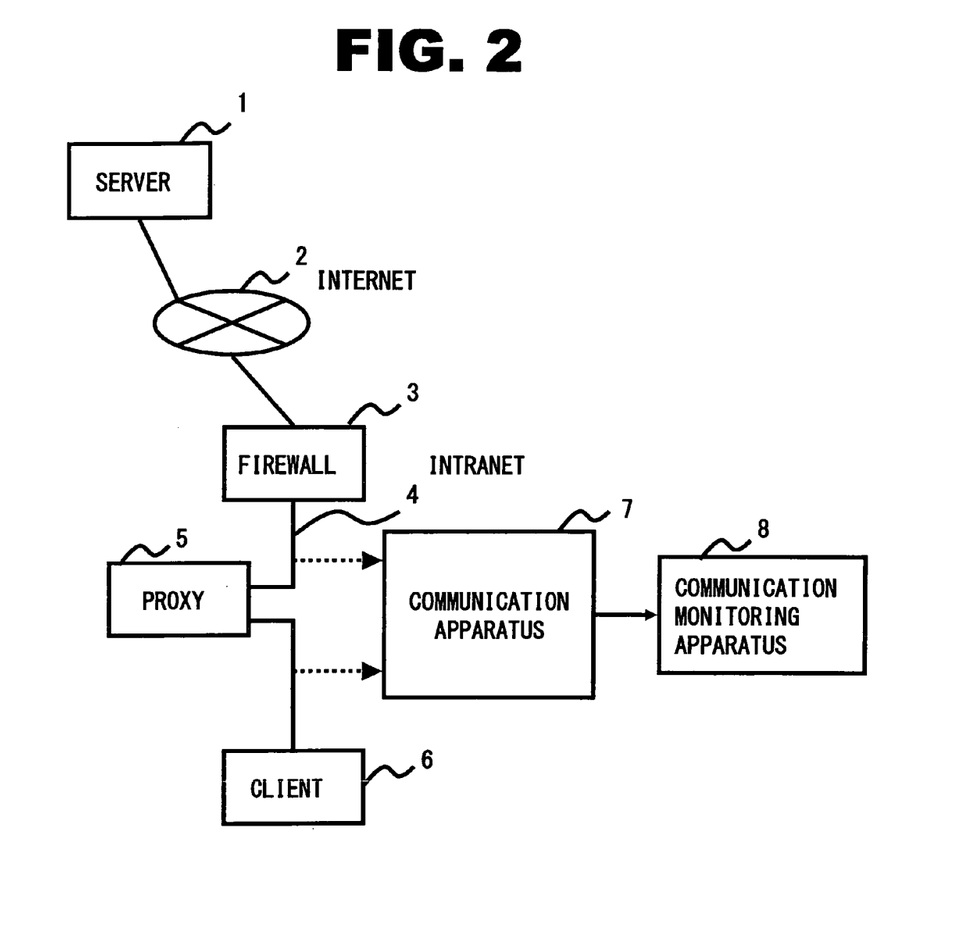
FIG. 2 is a schematic configurational view according to the embodiment of the invention.

FIG. 1 is a view illustrating an example of unauthorized communication to be discussed in the embodiment. An A client 20, a B client 21, a C client 22, and a D client 23 perform unauthorized communication respectively. Further, encryption method lists in browsers installed in the clients are a same encryption method list. The encryption method lists denote lists of encryption methods that can be used in the clients. A server 1 is a web server that performs unauthorized communication. In a case where the number of servers is counted for each of the encryption method based on HTTP packets 30 sent from the clients, since the type of the servers is same, a characteristic that the number of server does not increase can be observed. The characteristic appears because the unauthorized communication is performed between the particular clients and a particular server. As described above, the characteristic is not observed in authorized communication. In FIG. 2, it is analogized that the unauthorized communication is realized by transmitting and receiving packets between a client 6 and the server 1, the packets in which unauthorized communication information for performing the unauthorized communication is set in regions relating to the HTTP or the SSL. A firewall 3 and a proxy 5 that are located between the client 6 and the server 1 are set to permit the HTTP and the SSL to permit web access of legitimate clients. Thus, the client 6 and the server 1 can freely transmit and receive the packets that include the unauthorized communication information. Accordingly, the unauthorized communication can be detected by setting a communication apparatus that can detect the above-described characteristics between the client 6 and the server 1.

2. Schematic Configurational View According to the Embodiment

FIG. 2 is a schematic configurational view of a communication system according to the embodiment of the invention. The system according to the embodiment includes the server 1, the Internet 2, the firewall 3, an intranet 4, the proxy 5, the client 6, the communication apparatus 7, and a communication monitoring apparatus 8.

The server 1 is an information processing apparatus corresponding to the HTTP and the SSL, and to be a communication destination of the client 6 that is used by a user who attempts to implement unauthorized communication. The server may be referred to as a first apparatus. The Internet 2 is the worldwide network system that connects individual information processing apparatuses and transmits and receives information. The firewall 3 is a system to prevent unauthorized packets from invading the intranet 4. The intranet 4 is a network established in a company using standard technologies in the Internet 2. The proxy 5 is an information processing apparatus that performs connection with the Internet 2 as "proxy" in place of an information processing apparatus connected to the intranet 4 that cannot be directly connected with the Internet 2. The client 6 is an information processing apparatus corresponding to the HTTP and the SSL and used by a user who attempts to implement unauthorized communication. The client 2 may be referred to as a second apparatus. The communication apparatus 7 is used to detect unauthorized communication performed between the server 1 and the client 6. When the communication apparatus 7 detects the unauthorized communication, notifies the communication monitoring apparatus 8 of detection information denoting the detection of the unauthorized communication. The communication monitoring apparatus 8 receives the detection information transmitted from the communication apparatus.

3. Hardware Configurational View of Communication Apparatus

Figure 3:
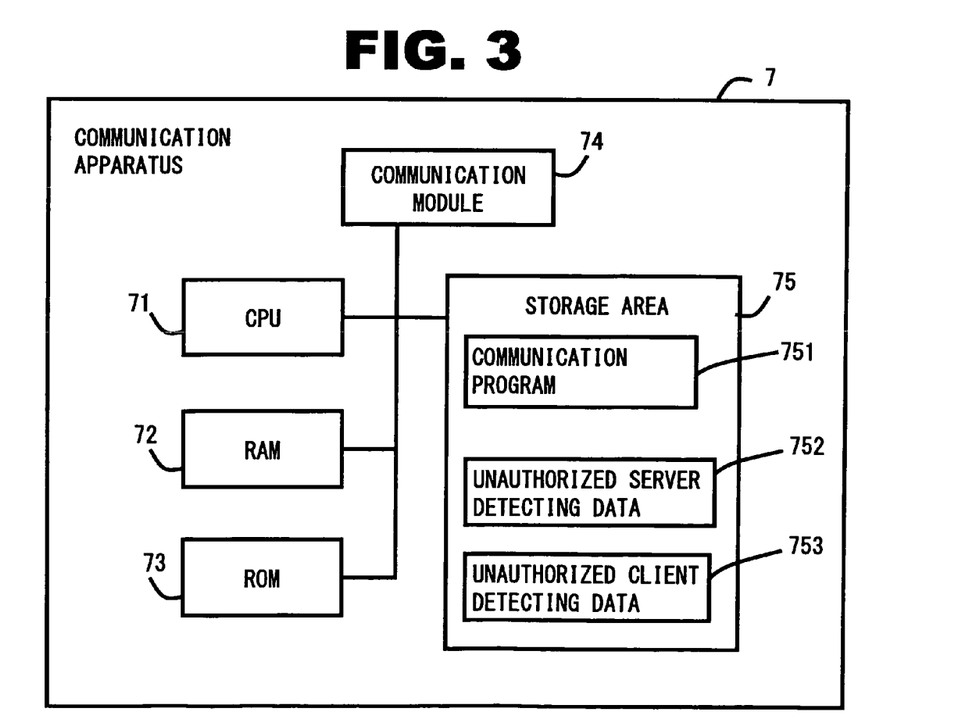
FIG. 3 is a hardware configurational view of a communication apparatus according to the embodiment of the invention.

FIG. 3 is a block diagram illustrating an example of a hardware configuration of the communication apparatus 7. The communication apparatus 7 includes a central processing unit (CPU) 71, a random access memory (RAM) 72, a read-only memory 73, a communication section 74, and a storage area 75.

The CPU 71 implements a communication program 751. The RAM 72 stores data for implementing the communication program 751 and data temporarily necessary for the communication program 751. The region to store the temporarily necessary data may be referred to as a temporary storage area. The ROM 73 stores data once written in. The communication section 74 communicates with the server 1, the firewall 3, the proxy 5, the client 6, and the communication monitoring apparatus 8 respectively. The communication section 74 corresponds to protocols such as Transmission Control Protocol (TCP)/Internet Protocol (IP) and the HTTP that are standard technologies in the Internet 2. The storage area 75 is an area to store the communication program 751, unauthorized server detection data 752, and unauthorized client detection data 753. The storage area 75 exists in an external storage apparatus such as hard disk (not shown). In the communication program 751, instructions to operate the communication apparatus 7 so as to detect packets relating to unauthorized communication from a communication log are described. The unauthorized server detection data 752 is used by the communication program 751 to detect a server that performs unauthorized communication. The unauthorized client detection data 753 is used by the communication program 751 to detect a client that performs unauthorized communication.

4. Configurational View of Unauthorized Server Detection Data

Figure 4:
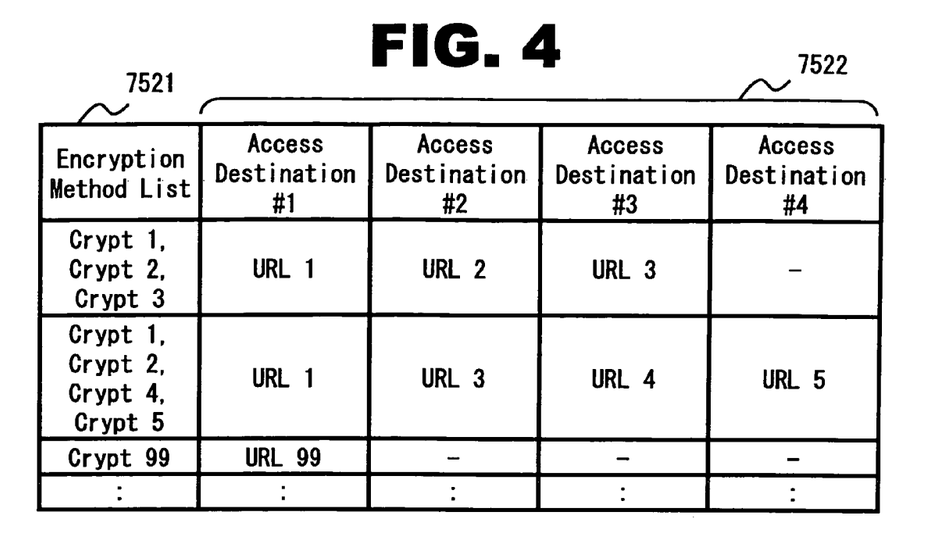
FIG. 4 is a configurational view of unauthorized server detection data according to the embodiment of the invention.

FIG. 4 illustrates the unauthorized server detection data 752 illustrated in FIG. 3. The unauthorized server detection data 752 is generated on the RAM 72 when the CPU 71 implements the communication program 751. The unauthorized server detection data 752 includes an encryption method list 7521 and access destinations 7522 as configurational elements. The encryption method list 7521 shows a table of encryption methods in the clients. The encryption methods are information that shows algorisms used for the encryption, sizes of keys, and combinations of hashes that are an algorism used to convert target data. The access destinations 7522 show web servers that implement unauthorized communication. The access destinations 7522 are represented by URL.

5. Configurational View of Unauthorized Client Detection Data

Figure 5:
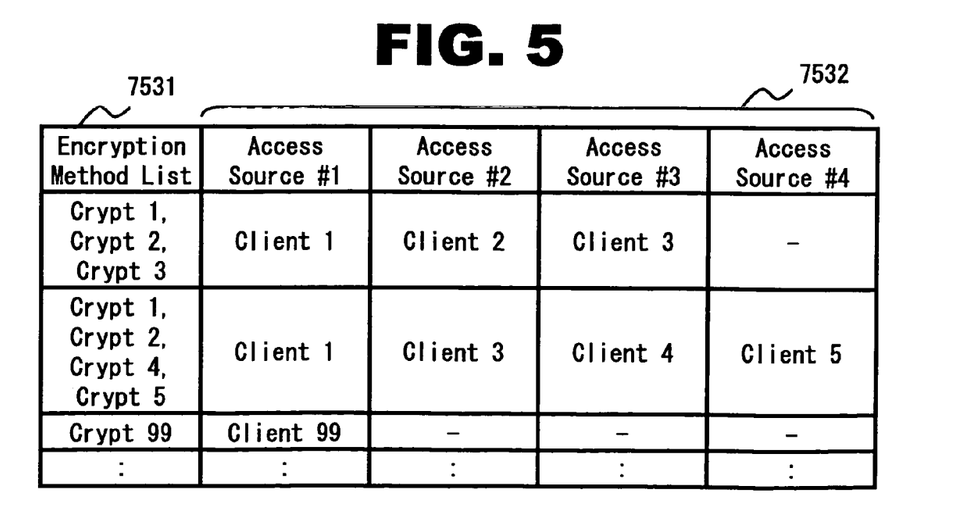
FIG. 5 is a configurational view of unauthorized client detection data according to the embodiment of the invention.

FIG. 5 is a configurational view of the unauthorized client detection data 753 in FIG. 3. The unauthorized client detection data 753 is generated on the RAM 72 when the CPU 71 implements the communication program 751. The unauthorized client detection data 753 includes an encryption method list 7531 and access sources 7532 as configurational components. The encryption method list 7531 are similar to the encryption method list 7521 in FIG. 4. The access sources 7532 show clients that implement unauthorized communication. The access sources 7532 are represented by IP addresses.

6. Packet Configuration

Figure 6:
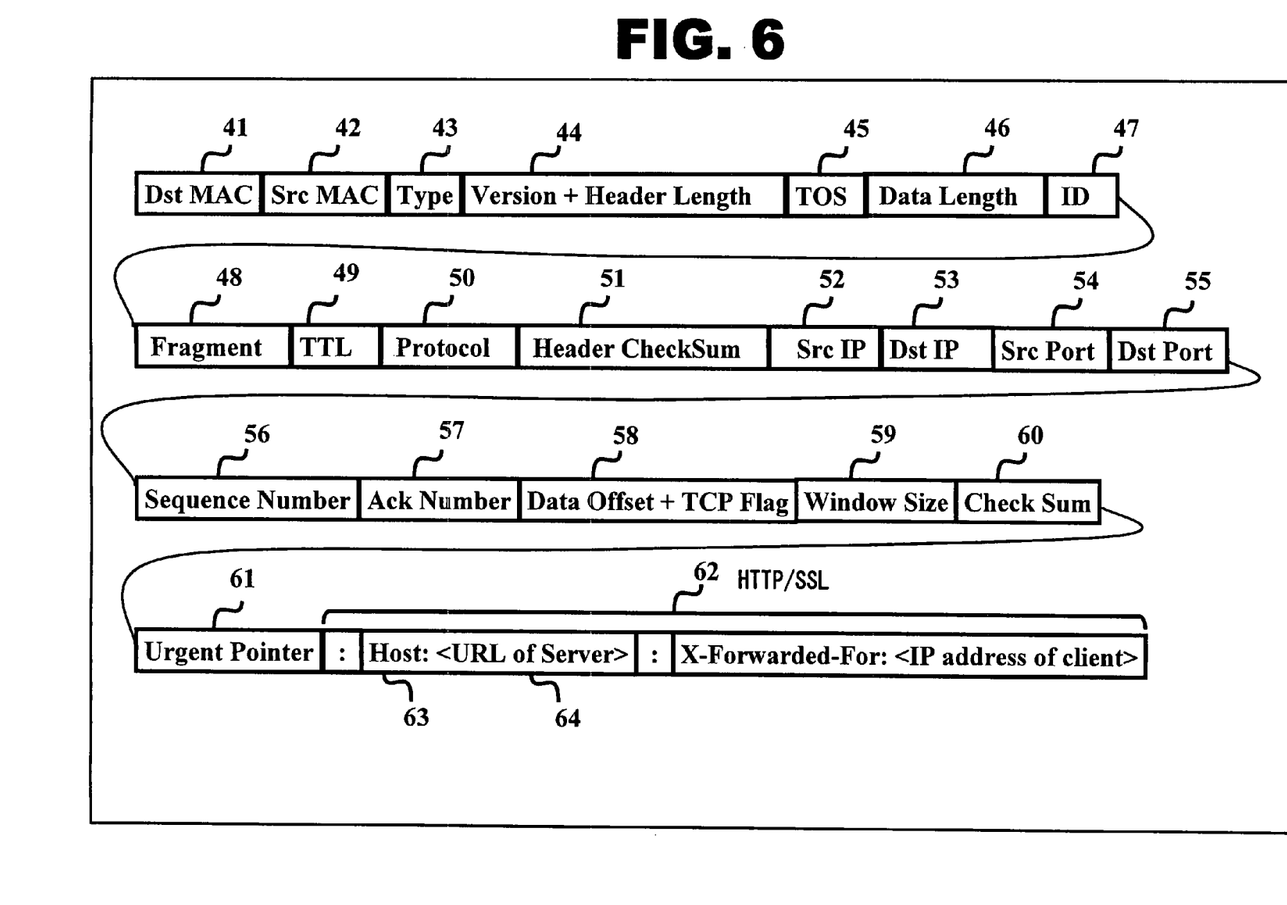
FIG. 6 is a packet configurational view according to the embodiment of the invention.

FIG. 6 illustrates a packet received by the communication apparatus 7 from the server 1, the firewall 3, the proxy 5, or the client 6. The packet includes, as information elements, destination (Dst) MAC 41, source (Src) MAC 42, Type 43, Version+Header Length 44, type of service (TOS) 45, Data Length 46, ID 47, Fragment 48, time to live (TTL) 49, Protocol 50, Header Checksum 51, Src IP 52, Dst IP 53, Src port 54, Dst port 55, Sequence Number 56, acknowledge (Ack) number 57, Data Offset+TCP Flag 58, Window Size 59, CheckSum 60, Urgent Pointer 61, and HTTP message 62. The Dst MAC 41 to the Type 43 denote a MAC header. The Version+Header Length 44 to the Dst IP 53 denote an IP header. The Src port 54 to the Urgent Pointer 61 denote a TCP header.

The Dst MAC 41 represents a MAC address of a destination of the packet. The MAC denotes media access control. The Src MAC 42 denotes a MAC address of a transmission source of the packet. The Type 43 denotes a type of the protocol. The Version+Header Length 44 denotes a version of an IP protocol and a length of the IP header. The TOS 45 denotes a priority in transmitting the packet. The Data Length 46 denotes length information of a length of the packet. The ID 47 denotes a number for identifying an individual packet. The Fragment 48 denotes whether the packet is a divided packet or not. The TTL 49 denotes a period the packet lives.

The Protocol 50 denotes a number of a protocol. The Header Checksum 51 denotes data for error detection. However, the Header Checksum 51 is not currently used. The Src IP 52 denotes an IP address of the transmission source of the packet. The Dst IP 53 denotes an IP address of the destination of the packet. The Src port 54 denotes a port number of the transmission source of the packet. The Dst port 55 denotes a port number of the destination of the packet. The Sequence Number 56 denotes a number used to identify transmitted data. The acknowledgement (Ack) number 57 denotes a number used to identify reception data. The Data Offset+TCP Flag 58 denotes a location where data is stored and communication control information (TCP flag). The communication control information may be referred to as establishment information for establish a session, or disconnect information for disconnecting a session. Here, the data denotes the HTTP message 62. The communication control information includes establishment information "SYN" that denotes communication establishment, acknowledgement information "ACK" that denotes acknowledgement from the receiving side, forced termination information "RST" that denotes forced termination, disconnect information "FIN" that denotes disconnection, or the like. The Window Size 59 denotes an amount of data transmittable at once without waiting for reception confirmation. The CheckSum 60 denotes data for checking whether an error exists or not. The Urgent Pointer 61 denotes a location of data to be urgently processed. The HTTP message 62 denotes data (HTTP data) used in the HTTP or data (SSL data) used in the SSL. An URL 63 denotes a web server to be an access destination. X-Forward For 64 denotes information used by the communication apparatus 7 to identify a client in a case where a packet is received via the proxy 5. The URL 63 and the X-Forward For 64 are examples of the HTTP data. An example of the SSL data is described below with reference to FIG. 7.

7. SSL Data Configurational View

Figure 7:
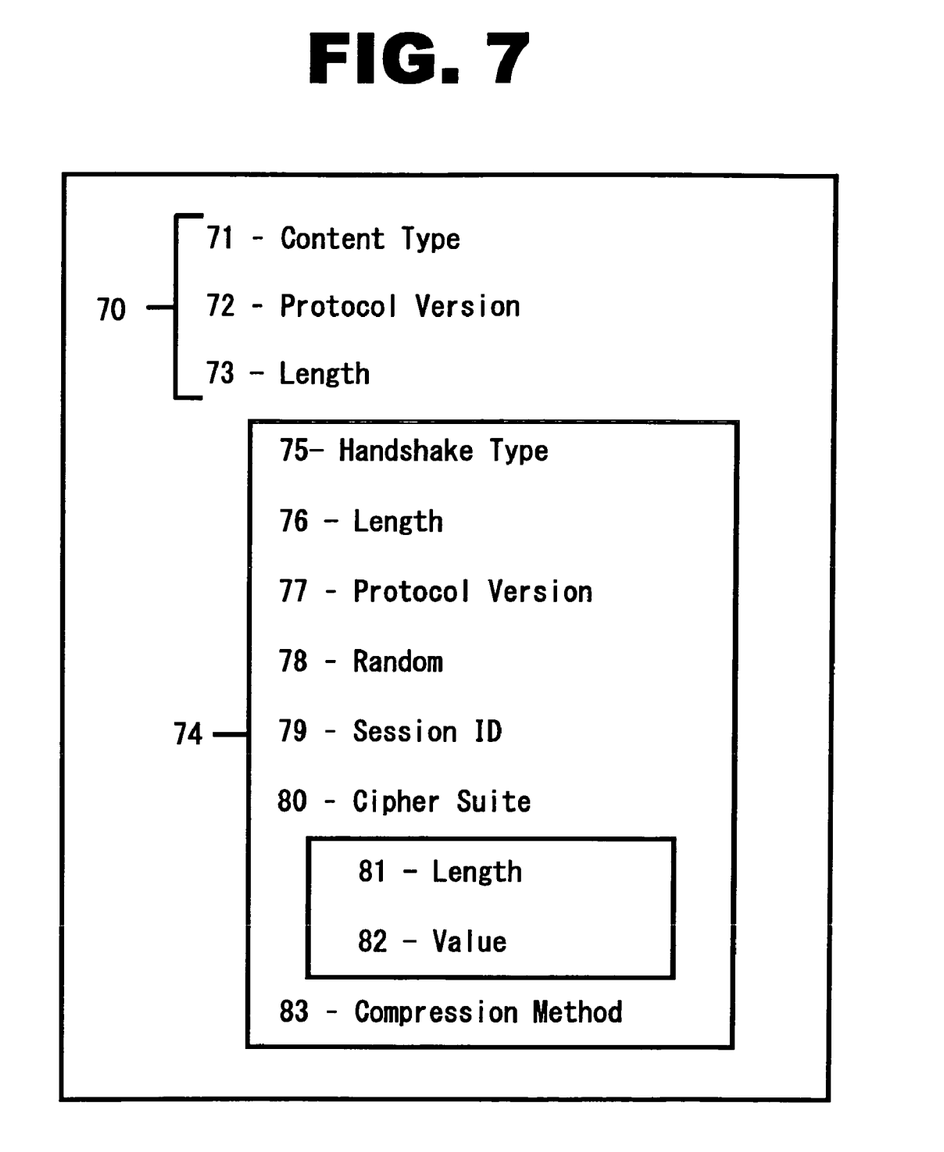
FIG. 7 is a SSL data configurational view according to the embodiment of the invention.

FIG. 7 illustrates SSL data in the HTTP/SSL 62 in FIG. 2. In the SSL, the number of layers is not defined. However, actually, the SSL protocol is composed of two layers. The layers are formed of a message layer 70 and a record layer 74. The message layer 70 includes information for realizing an authentication function and a negotiation function. The authentication function is configured to authenticate whether a server and a client are proper or not. The negotiation function is configured to select encryption information that can be used in both of the server and the client. The record layer 74 includes information for realizing encryption. The message layer 70 includes ContentType 71, ProtocolVerson 72, and Length 73 as information elements. The ContentType 71 denotes a type of a protocol that is used in the record layer. In the embodiment, the Handshake Protocol (16) is used. The Handshake Protocol is used to exchange a key between a client and a server used for encryption and to perform authentication. The handshake denotes to perform highly reliable communication while a transmitting side and a receiving side perform confirmation with each other. The ProtocolVerson 72 denotes a version of the SSL. For example, the SSL protocol version 3.0 (03 00) and version 3.1 (03 01) are provided. The Length 73 denotes a length of the record layer 74. The record layer 74 includes, as information elements, Handshake Type 75, Length 76, ProtocolVersion 77, Random 78, SessionID 79, CipherSuite 80, Length 81, Value 82, and CompressionMethod 83. The Handshake Type 75 denotes a type of message used in the Handshake Protocol. In the embodiment, a ClientHello (ClientHello (10)) is used. The ClientHello is used when a client notifies a server of a start of SSL communication. The Length 76 denotes a length of subsequent data. The ProtocolVersion 77 denotes a version of the SSL required by the client to the server. The version is, for example, the SSL protocol version 3.0 (03 00) or version 3.1 (03 01). The Random 78 is a random number. The SessionID 79 is used in a case where SSL communication was performed in the past and a negotiation result used in the SSL communication is employed. The CipherSuite 80 denotes encryption methods that can be used by a client. The CipherSuite 80 is composed of Length 81 and Value 82. The Length 81 denotes a length of a value that shows an encryption method. The Value 82 denotes a value of the encryption method. The value of the encryption method is, for example, two-byte units such as 00 04 (TLS_RSA_WITH_RC4_126_MD5). The encryption method denotes information that shows an algorism used for encryption, a size of a key, a combination of hashes that are an algorism used for conversion of target data. The CompressionMethod 83 is composed of a length of a value that shows a message compression method that can be used by the client and a value that is shown according to the compression method. The Value 82 is to be used as encryption information.

8. Flowchart of Unauthorized Communication Detection Processing (Example 1)

Figure 8:
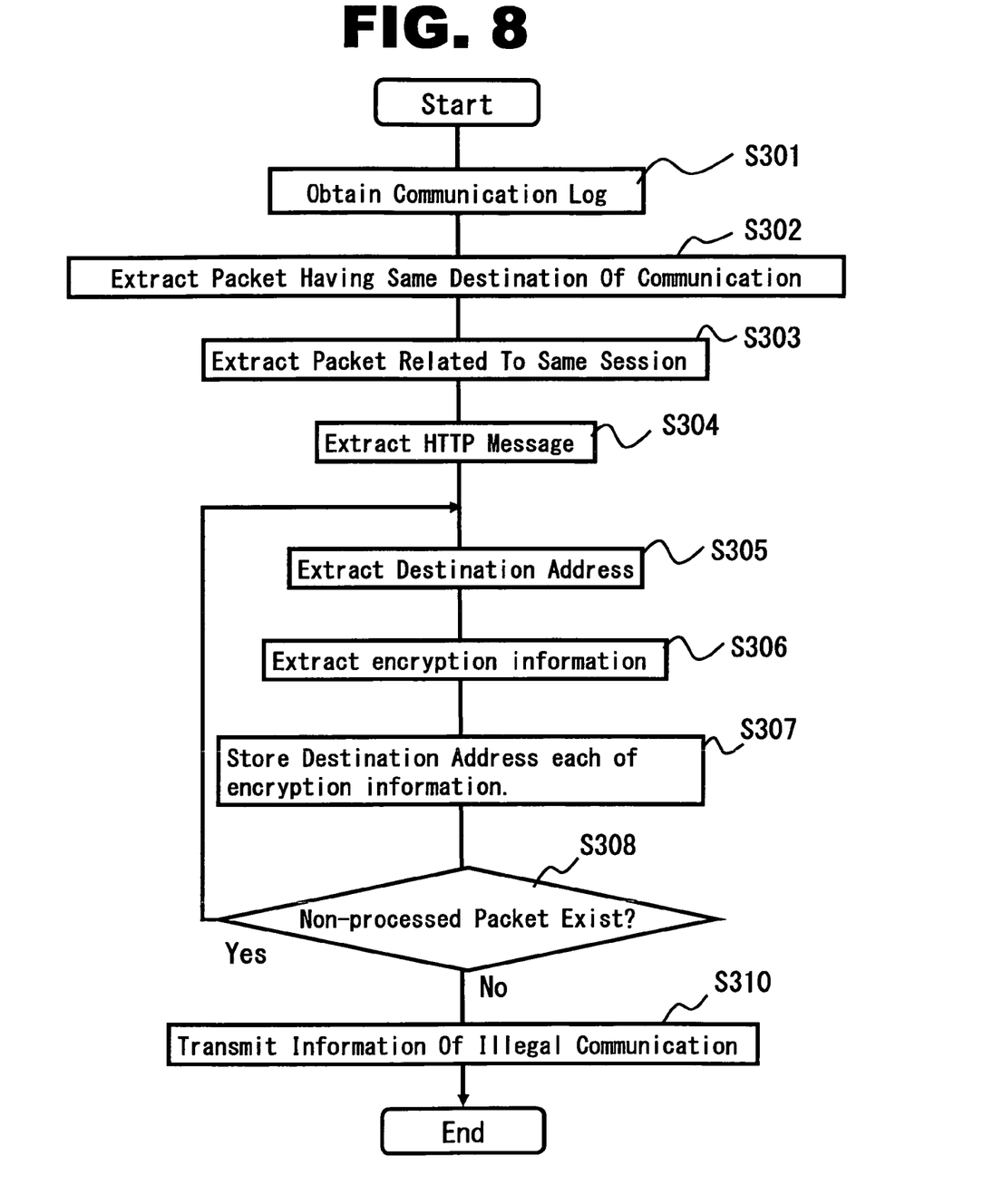
FIG. 8 is a flowchart (example 1) illustrating unauthorized communication detection processing according to the embodiment of the invention.

FIG. 8 is a flowchart illustrating a procedure performed by the communication apparatus 7 for detecting a server that performs unauthorized communication. The CPU 71 in the communication apparatus 7 realizes the procedure for detecting the server that performs unauthorized communication by implementing the communication program 751.

In step S301, the CPU 71 acquires a communication log. In the communication log, packets that are received by the communication apparatus from any one of the server 1, the firewall 3, the proxy 5, and the client 6 are stored on the storage area 75 together with time and date the packets are received. The packets are similar to the packet described in FIG. 6. The above time and date is acquired from a clock management function (not shown) in the communication apparatus 7. An acquisition trigger of the communication log can be set at any timing by a manufacturer of the communication apparatus or a user. The CPU 71 acquires the communication log from the storage area 75 and stores the acquired communication log on the temporary storage area.

In step S302, the CPU 71 extracts packets that have a same communication destination from the communication log stored in the temporary storage area in S301. In the extraction, the CPU 71 checks the Src IP 52, the Dst IP 53, the Src port 54, and the Dst port 55 in each packet in the communication log. Then, the CPU 71 extracts packets that have same Src IP 52, Dst IP 53, Src port 54, and Dst port 55, and stores the extracted packets in the temporary storage area.

In step S303, the CPU 71 extracts packets that relate to a same session from packets that have the same communication destination extracted in step S302. In the extraction, the CPU 71 checks the TCP flags 58 in each packet that has the same communication destination and finds packets that have the establishment information "SYN" for establishing a session, and the forced termination information "RST" for forcibly terminating a session, or the disconnect information "FIN" for disconnecting a session. Then, the CPU 71 extracts packets between the packet that has the TCP flag 58 of the establishment information "SYN", and the packet that has the TCP flag 58 of forced termination information "RST" or the packet that has the TCP flag 58 of the disconnect information "FIN" from each packet that has the same communication destination. The CPU 71 stores the extracted packets in the temporary storage area. Further, the CPU 71 stores the number of the extracted packets as the number of packets on the temporary storage area.

In step S304, the CPU 71 extracts HTTP messages from the packets that relate to the same session extracted in step S303. In the extraction, the CPU 71 calculates a start address and a final address of the HTTP message 62, and extracts data between the start address and the final address. The start address is calculated by adding the Version+Header Length 44, the Data Offset+TCP Flag 58, and 1 byte to 14 bytes. The final address is calculated by adding the Data Length 46 to 14 bytes. The 14 bytes are a length obtained by adding the Dst MAC 41, the Src MAC 42, and the Type 43. Then, the CPU 71 stores the extracted packets on the temporary storage area.

In step S305, the CPU 71 extracts the URLs 63 from the HTTP messages 62 extracted in step S304. The extraction method is described below. First, the CPU 71 extracts packets that start with any one of "CONNECT", "GET", "POST", and "HEAD" from the above-described packets. The "CONNECT" is an instruction used when a client get connection to a server. The "GET" is an instruction used when a client takes information from a server. The "POST" is an instruction used when a client transmits information to a server. The "HEAD" is an instruction used when a client takes attribute information from a server. Then, the CPU 71 extracts the URLs 63 from the HTTP messages 62 that are extracted in the first processing. The URLs 63 may be referred to as destination information. The CPU 71 stores the extracted URLs 63 in the temporary storage area.

In step S306, the CPU 71 extracts encryption information from the HTTP messages 62 that are extracted in step S304. Here, the Values 82 that represent the encryption information are extracted. The extraction method is described below. First, the CPU 71 extracts packets that have the ContentType 71 of the Handshake Protocol (16), and the HandshekeType 75 of the ClientHello (10) from the above-described packets. Then, the CPU 71 stores the extracted packets in the temporary storage area. Secondly, the CPU 71 extracts the Values 82 from the HTTP/SSL data that is extracted in the first processing. Then, the CPU 71 stores the extracted Values 82 in the temporary storage area. In the extraction processing, it is possible to add conditions that the ProtocolVersion 72 or the ProtocolVersion 77 is the version 3.0 (03 00) or the version 3.1 (03 01) to the conditions to extract the Values 82. Further, it is possible to add a condition that the Values 82 are defined according to the SSL specification to the conditions to extract the Values 82.

In step S307, the CPU 71 records the URLs 63 and the Values 82 in the unauthorized server detection data 752 in FIG. 4. The URLs 63 are the URLs extracted in step S306. The record is formed by counting the types of the URLs 63 for each Value 82. The record is formed as described below.

In a case where the Values 82 do not exist in the encryption method list 7521, the CPU 71 stores the Values 82 in the encryption method list 7521. Then, the CPU 71 stores the URLs 63 in the access destinations 7522 that correspond to the encryption method list 7521.

In a case where the Values 82 exist in the encryption method list 7521, the CPU 71 does not store the Values 82 in the encryption method list 7521. Further, in a case where the URLs 63 do not exist in the access destinations 7522 that corresponds to the encryption method list 7521, the CPU 71 stores the URLs 63 in the access destinations 7522. In a case where the URLs 63 exist in the access destinations 7522 that correspond to the encryption method list 7521, the CPU 71 does not store the URLs 63 in the access destinations 7522. Finally, the CPU 71 subtracts one from the number of the packets stored in step S303.

In step S308, the CPU 71 determines whether an unprocessed packet exists or not. In the determination, the CPU 71 determines whether the number of the packets in the temporary storage area is zero or not. As a result of the determination, if the number of the packets is not zero, the CPU 71 performs the processing in step S305.

In step S310, the CPU 71 generates a packet that includes the record data and transmits the packet to the communication monitoring apparatus 8. The record data is the unauthorized server detection data 752. The CPU 71 extracts the unauthorized server detection data 752 from the storage area 75. The CPU 71 extracts an IP address of the communication monitoring apparatus 8 stored in the storage area 75. The CPU 71 generates a packet that includes the unauthorized server detection data 752 and the IP address of the communication monitoring apparatus 8. The CPU 71 transmits the generated packet to the communication monitoring apparatus 8. A user of the communication monitoring apparatus 8 can find a candidate server that relates to the unauthorized communication from the notified unauthorized server detection data 752. The server that relates to the unauthorized communication can be identified from servers that have smaller types of access destinations than other servers.

The record data may be output by the CPU 71 by generating a message that denotes the unauthorized communication relating to access destinations that are equal to a threshold or less and transmitting the generated message to the communication monitoring apparatus 8. The threshold is set to any value by the manufacturer or the user of the communication apparatus 7. For example, the threshold may be one. The value is employed to identify an access destination that may be performing unauthorized communication from the recorded information. The CPU 71 extracts session start time, a destination URL, and a client IP address from the communication log. The session start time is date and time a session of a packet that detects the number of appearances of values that are equal to or less than the threshold is established. The date and time is when a packet is received, the packet is right before the packet that detects the number of appearances of the values that are equal to or less than the threshold, and in which the TCP flag is set to the establishment information "SYN". The destination URL and the client IP address exist in the HTTP message 62 in the packet that detects the number of appearances of the values that are equal to or less than the threshold. The CPU 71 generates data that "A client that mounts a certain encryption method accesses a particular site." that is to be set as a detection reason. Then, the CPU 71 extracts the IP address of the communication monitoring apparatus 8 stored in the storage area 75. The CPU 71 generates a packet that includes the session start time, the destination URL, the client IP address, and the detection reason. The CPU 71 transmits the generated packet to the communication monitoring apparatus 8.

Figure 10:
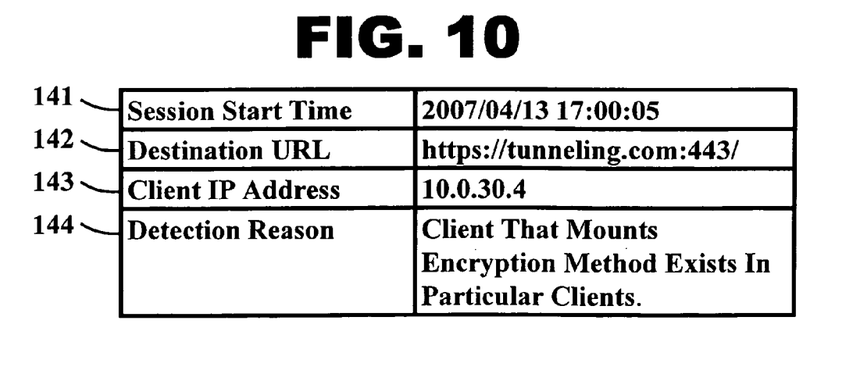
FIG. 10 is a view illustrating an example of a message that denotes unauthorized communication according to the embodiment of the invention.

FIG. 10 is a view illustrating an example of the message that denotes the unauthorized communication. Session start time 41 is date and time when the packet right before the packet that detects the number of appearances of the values that are equal to or less than the threshold, the packet in which the TCP flag is set to the establishment information "SYN" is received. A destination URL 42 denotes a destination URL that exists in the HTTP message 62 in the packet that detects the number of appearances of the values that are equal to or less than the threshold. A client IP address 43 denotes a client IP address that exists in the HTTP message 62 in the packet that detects the number of appearances of the values that are equal to or less than the threshold. A detection reason 44 denotes the reason for detecting the client that performs unauthorized communication.

9. Flowchart of Unauthorized Communication Detection Processing (Example 2)

Figure 9:
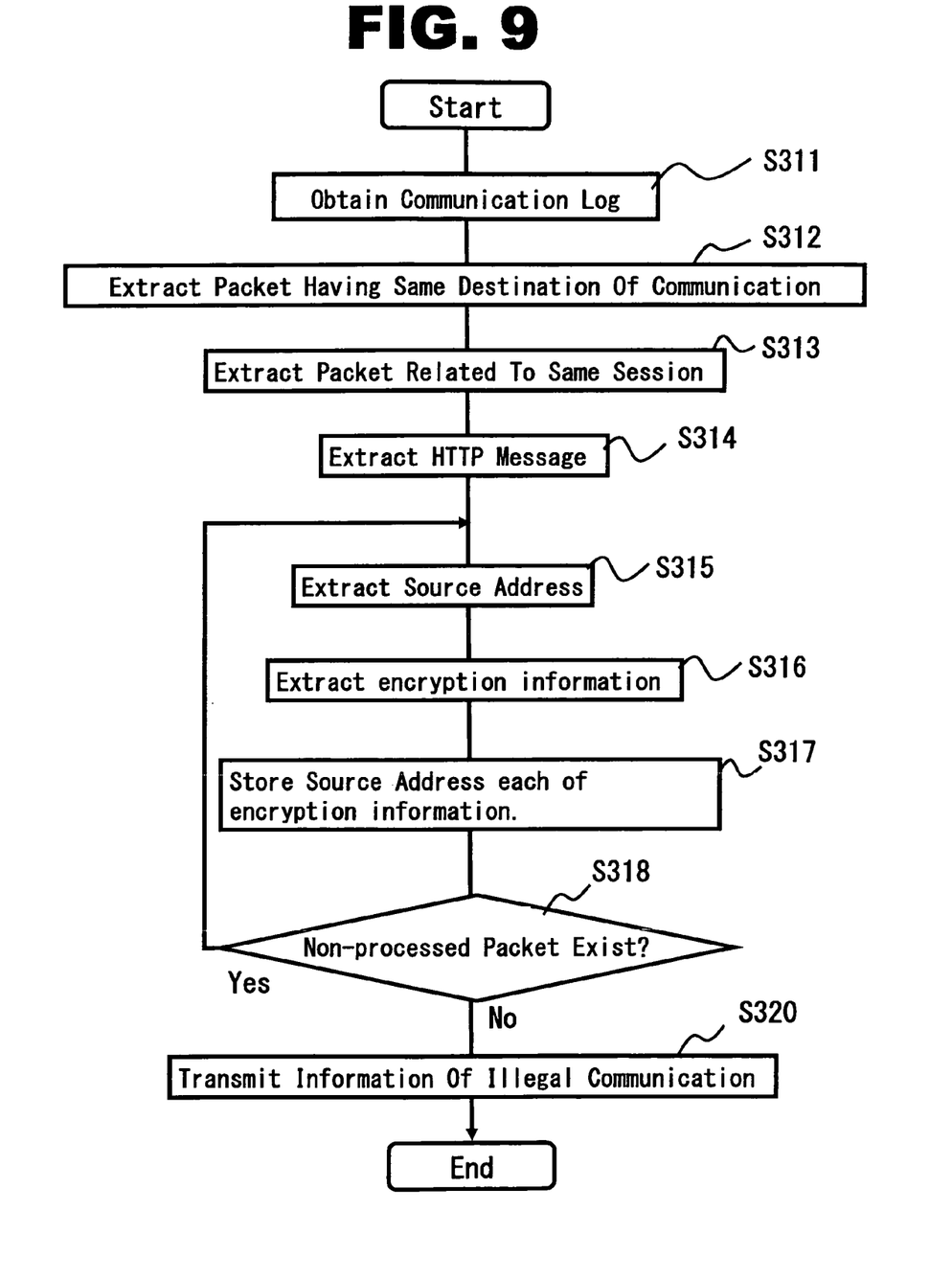
FIG. 9 is a flowchart (example 2) illustrating unauthorized communication detection processing according to the embodiment of the invention.

FIG. 9 is a flowchart illustrating a procedure performed by the communication apparatus 7 for detecting a client that performs unauthorized communication. The CPU 71 in the communication apparatus 7 realizes the procedure for detecting the client that performs unauthorized communication by implementing the communication program 751.

Processing from step S311 to S314 is similar to that from step S301 to S304 in FIG. 8.

In step S315, the CPU 71 extracts transmission source addresses from the packets relating to the same session that are extracted in step S313 or the HTTP messages 62 extracted in step S314. Here, the Src IPs 52 or the X-Forwarded-Fors 64 that denote the transmission source addresses are extracted. In a case where the proxy 5 does not exist between the communication apparatus 7 and the client 6, the Src IPs 52 are extracted. In a case where the proxy 5 exists between the communication apparatus 7 and the client 6, the X-Forwarded-Fors 64 are extracted. This is because if the proxy 5 exists between the communication apparatus 7 and the client 6, the proxy 5 overwrites the Src IPs 52. The CPU 71 stores data that denotes the extracted transmission source addresses in the temporary storage area.

Processing performed in step S316 is similar to that in step S306 in FIG. 8.

In step S317, the CPU 71 records the Src IPs 52 or the X-Forwarded-Fors 64 and the Values 82 in the unauthorized client detection data 753 in FIG. 5. The Src IPs 52 or the X-Forwarded-Fors 64 are extracted in step S315. The Values 82 are extracted in step S316. The record is formed by counting types of the Src IPs 52 or the X-Forwarded-Fors 64 for each Value 82. Specifically, the record is formed as described below. In a case where the Values 82 do not exist in the encryption method list 7521, the CPU 71 stores the Values 82 in the encryption method list 7521. Then, the CPU 71 stores the Src IPs 52 or the X-Forwarded-Fors 64 in the access destinations 7522 that corresponds to the encryption method list 7521. In a case where the Values 82 exist in the encryption method list 7521, the CPU 71 does not store the Values 82 in the encryption method list 7521. In a case where the Src IPs 52 or the X-Forwarded-Fors 64 do not exist in the access destinations 7522 that correspond to the encryption method list 7521, the CPU 71 stores the Src IPs 52 or the X-Forwarded-Fors 64 in the access destinations 7522. In a case where the Src IPs 52 or the X-Forwarded-Fors 64 exist in the access destinations 7522 that correspond to the encryption method list 7521, the CPU 71 does not store the Src IPs 52 or the X-Forwarded-Fors 64 in the access destinations 7522.

Processing performed in step S318 is similar to that in step S308 in FIG. 8.

In step S320, the CPU 71 generates a packet that includes the record data and transmits the packet to the communication monitoring apparatus 8. The record data is the unauthorized client detection data 753. The CPU 71 extracts the unauthorized client detection data 753 from the storage area 75. The CPU 71 extracts the IP address of the communication monitoring apparatus 8 stored in the storage area 75. The CPU 71 generates a packet that includes the unauthorized client detection data 753 and the IP address of the communication monitoring apparatus 8. The CPU 71 transmits the generated packet to the communication monitoring apparatus 8. The user of the communication monitoring apparatus 8 can find a candidate client that relates to the unauthorized communication from the notified unauthorized client detection data 753. The client that relates to the unauthorized communication can be identified from clients that have smaller types of access destinations than other servers.

The record data may be output by the CPU 71 by generating a message that denotes the unauthorized communication relating to an encryption method list in which the number of the transmission source addresses is equal to a threshold or less and transmitting the generated message to the communication monitoring apparatus 8. The threshold is set to any value by the manufacturer or the user of the communication apparatus 7. For example, the threshold may be one. The value is employed to identify an encryption method list that has a highest possibility in performing unauthorized communication from the recorded information. The message is similar to that in step S310 in FIG. 8. One point different from the message in step S310 is a content of the detection reason. Here, the detection reason is that a client that mounts an encryption method exists in particular clients.

Accordingly, it is an embodiment of the invention to detect unauthorized communication based on characteristics analogized from packets.

According to the above-described means, unauthorized communication can be detected based on characteristics analogized based on packets or a communication log that stores the packets. Further, the detected information relating to the unauthorized communication can be notified to a manager of the network.

Although the invention has been described with reference to the embodiment, it is to be noted that the invention is not limited to the above embodiment, but equivalents may be employed without departing from the scope of the invention as recited in the claims.

What is claimed is:

1. A method for controlling an apparatus for transferring data from a plurality of first devices to a second device via a network, the data being transferred by using packets, the method comprising:
    extracting HyperText Transport Protocol messages from the packets;
    extracting cipher suite information as encryption information for identifying an encryption method from the extracted HyperText Transport Protocol messages;
    counting a number of kinds of the encryption information extracted from packets associated with each of the communication destinations of the packets, respectively;
    detecting one of the plurality of first devices that uses one kind of encryption information and accesses same communication destination, based upon the counted number of kinds of the encryption information associated with the communication destinations of the packets; and
    determining that a communication corresponding to the detected one of the plurality of first devices is an unauthorized communication.

2. The method according to claim 1, wherein the data is encrypted by secure socket layer protocol, and the extracting of encryption information extracts value information as the encryption information from the cipher suite information.

3. The method according to claim 1, further comprising extracting destination information based upon uniform resource locator information.

4. An apparatus for transferring data from a plurality of first devices to a second device via a network, the data being transferred by using a packet, comprising:
    a processor for executing a process comprising:
    extracting HyperText Transport Protocol messages from the packets;
    extracting cipher suite information as encryption information for identifying an encryption method from the extracted HyperText Transport Protocol messages;
    counting a number of kinds of the encryption information extracted from packets associated with each of the communication destinations of the packets, respectively;
    detecting one of the plurality of first devices that uses one kind of encryption information and accesses same communication destination, based upon the counted number of kinds of the encryption information associated with the communication destinations of the packets; and determining that a communication corresponding to the detected one of the plurality of first devices is an unauthorized communication.

5. The apparatus according to claim 4, wherein the data is encrypted by secure socket layer protocol, and the extracting process of encryption information extracts value information as the encryption information from the cipher suite information.

6. The apparatus according to claim 4, wherein the data is transferred by hypertext transfer protocol, and the processor executes extracting destination information based upon uniform resource locator information.

* * * * *